United States Patent

Stikkers

[15] 3,702,570
[45] Nov. 14, 1972

[54] DRIVE FOR VEHICLE MOUNTED ALTERNATOR

[72] Inventor: Tieme C. Stikkers, Brookline Station, Mo.

[73] Assignee: Dayco Corporation, Dayton, Ohio

[22] Filed: Oct. 7, 1971

[21] Appl. No.: 187,483

[52] U.S. Cl. .................... 74/242.15 R, 74/242.13 R
[51] Int. Cl. ............................................. F16h 7/10
[58] Field of Search...74/13, 242.12, 242.13, 242.14, 74/242.15, 105

[56] References Cited

UNITED STATES PATENTS

| | | | |
|---|---|---|---|
| 2,570,527 | 10/1951 | Dahl | 74/242.15 R |
| 3,421,724 | 1/1969 | Cornell | 74/242.13 R |

Primary Examiner—Milton Kaufman
Assistant Examiner—Frank H. McKenzie
Attorney—Reuben Wolk

[57] ABSTRACT

An alternator is adjustably mounted adjacent a hinged end of an elongated hingedly mounted support carried by a vehicle and the alternator has a driven sheave fixed to its rotor. An idler sheave assembly is carried adjacent the opposite end of the elongated support and at least one power transmission belt is operatively connected between the driven sheave and the sheave assembly. A driver sheave is mounted against the end of a rotatable axle of the vehicle for rotation therewith and at least another power transmission belt is operatively connected between the driver sheave and the sheave assembly. A spring assembly yieldingly urges the support about its hinged end thereby moving the sheave assembly away from the driver sheave and placing constant yielding tension on the other belt thereby assuring that the alternator is driven in an optimum manner by the driver sheave.

20 Claims, 7 Drawing Figures

PATENTED NOV 14 1972

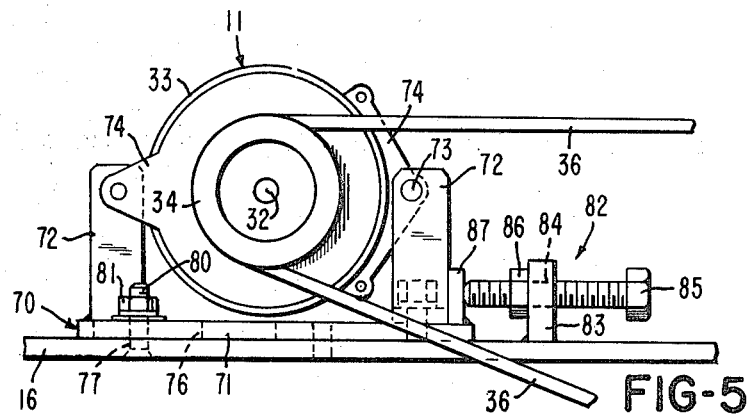

DRIVE FOR VEHICLE MOUNTED ALTERNATOR

BACKGROUND OF THE INVENTION

Various drives have been proposed heretofore for alternators which are mounted on vehicles such as railroads cars and the like; however, each of these previously proposed drives is comparatively expensive because it is usually driven by a driver pulley which is fixed to an associated axle comprising the railroad car inboard of an associated wheel for such car and requires complicated linkages, numerous idler sheaves, and belts of special design which must travel in complex paths. In addition, each of these drives is expensive to maintain and requires frequent replacement of belts.

SUMMARY

This invention provides an improved drive for a vehicle mounted alternator which is of economical construction, utilizes a minimum number of components, and may be operated for extended periods with comparatively little servicing while driving its associated alternator with optimum efficiency. In particular, the alternator with a driven sheave fixed to its rotor is mounted on an elongated support which is hingedly mounted at one end on the vehicle and the alternator is adjustably mounted adjacent the one end. An idler sheave assembly is carried adjacent the opposite end of the elongated support and at least one power transmission belt is operatively connected between the driven sheave and the sheave assembly. A driven sheave is mounted against the end of a rotatable axle of the vehicle for rotation therewith and at least another power transmission belt is operatively connected between the driver sheave and the sheave assembly. Means is provided for yielding urging the elongated support about its hinged thereby moving the sheave assembly away from the driver sheave and placing constant yielding tension on the other belt thereby assuring that the alternator is driven in an optimum manner by the driver sheave.

Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which

FIG. 5 is a fragmentary view particularly illustrating a carrier and associated means for adjustably supporting the alternator on an elongated support comprising the drive apparatus of FIG. 1;

FIG. 6 is a fragmentary view similar to FIG. 5 illustrating another means which may be used in lieu of the carrier of FIG. 5 for adjustably supporting the alternator on the elongated support; and FIG. 7 is a fragmentary perspective view illustrating a tension spring device which may be used in lieu of a compression spring device for yielding urging the swinging end of the elongated support of the drive of FIG. 1 to tighten the belts operating around the driver sheave.

DESCRIPTION OF ILLUSTRATED EMBODIMENTS

Figure 1:
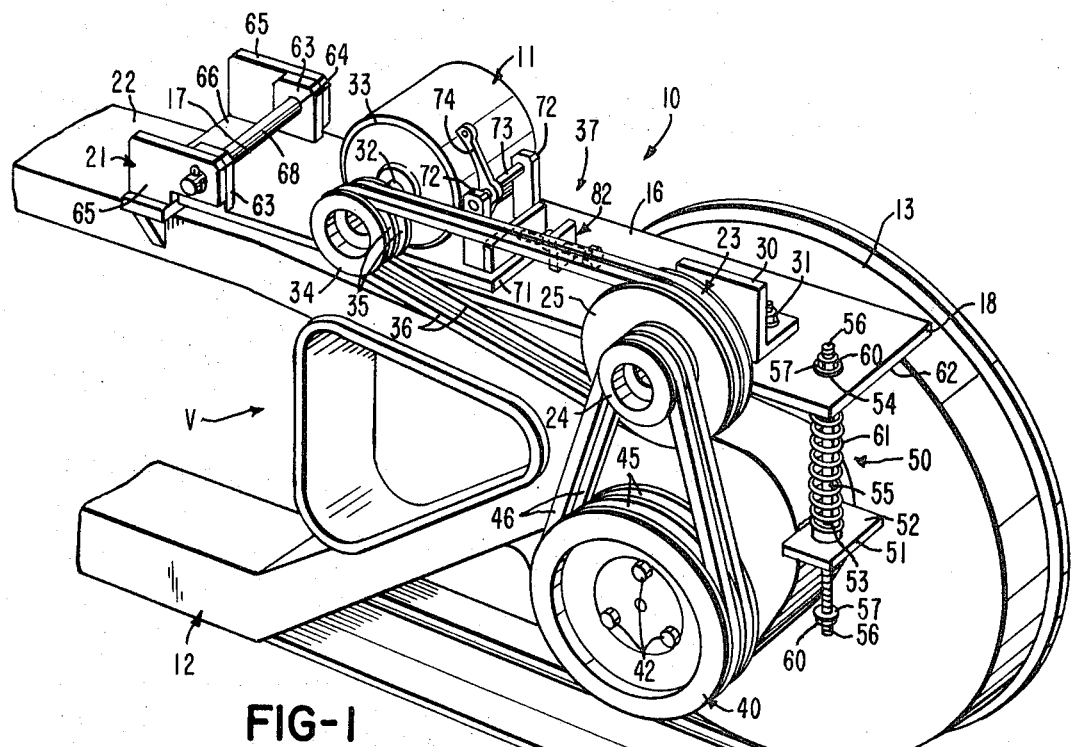
FIG. 1 is a perspective view illustrating one exemplary embodiment of the drive apparatus of this invention.

Reference is now made to FIG. 1 of the drawings which illustrates one exemplary embodiment of the drive apparatus of this invention which is designated generally by the reference numeral 10. The drive apparatus 10, which for simplicity will be referred to as drive 10, is particularly adapted for driving an alternator 11 carried on a vehicle shown as a railway vehicle V which may be in the form of a railway car, caboose, etc., which comprises a conventional frame structure 12 having wheels 13 suitably mounted thereon and in this example of a railway vehicle V, the wheels are adapted to roll on a conventional track 14. An axle 15 extends between an associated pair of wheels 13 and supplies the necessary rotary motion once the railway vehicle is moved along track 14 by its locomotive to drive the alternator 11.

The drive apparatus or drive 10 comprises an elongated support 16 having opposed ends 17 and 18 with end 17 being hingedly or pivotally mounted using bracket assembly 21 which is fixed to the floor 22 of the vehicle V. The elongated support 16 carries an idler sheave assembly 23 and the alternator 11 adjacent its opposite ends as will now be explained.

Figure 2:
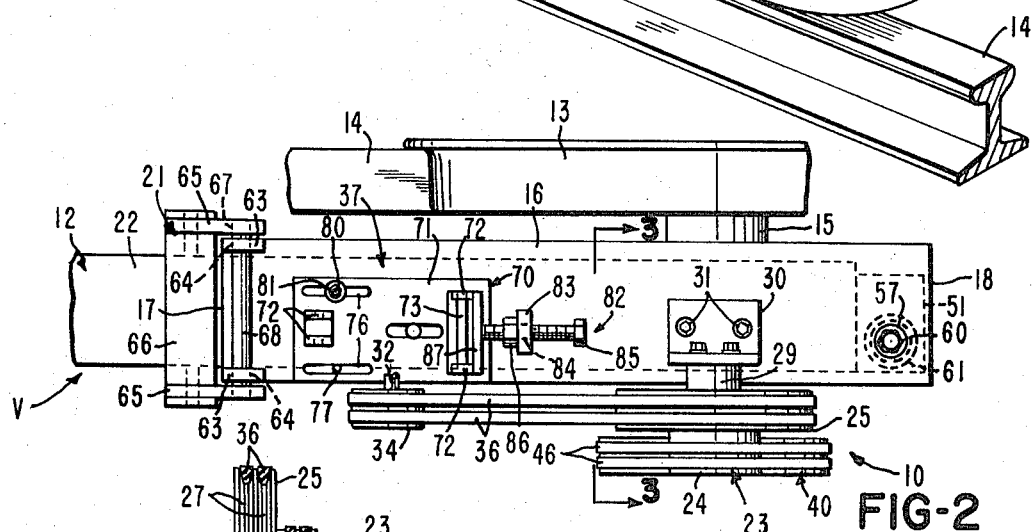
FIG. 2 is a top plan view of the apparatus illustrated in FIG. 1.
Figures 3, 4:
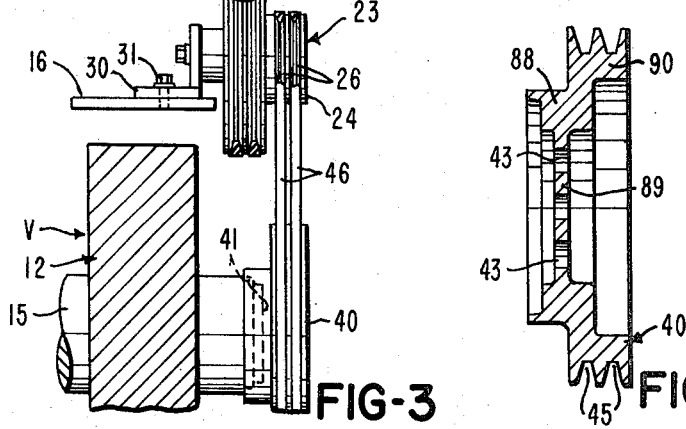
FIG. 3 is a view particularly illustrating a driver sheave, idler sheave assembly, and associated belts of the drive apparatus viewed on the line 3—3 of FIG. 2.
FIG. 4 is a cross-sectional view particularly illustrating the driver sheave comprising the drive apparatus of FIG. 1.

The drive 10 has the idler sheave assembly 23 rotatably supported at a fixed position adjacent end 18 of the support 16, see FIGS. 2 and 3, and the sheave assembly 23 is in the form of a step idler comprised of a pair of co-axial sheaves 24 and 25 which are suitably fixed together. Each sheave 24 and 25 has a plurality of grooves 26 and 27 respectively therein and each groove 26-27 is adapted to receive an associated power transmission belt in the form of a V-belt of standard construction. As best seen in FIG. 2, the assembly 23 is suitably supported in an antifriction bearing device 29 which is carried by a roughly L-shaped flange 30 which is attached to the support 16 by threaded screws 31 threadedly received within associated threaded holes in the support.

The alternator 11 has a standard rotor provided with a conventional rotor shaft 32 extending outwardly beyond its main housing 33. A sheave which will be referred to as the driven sheave 34 is suitably fixed to the outer end of shaft 32. The sheave 34 has a pair of grooves 35 which correspond in configuration to the grooves 27 in the sheave 25 comprising the idler sheave assembly 23, and belt means in the form of a plurality of two conventional V-belts 36 are operatively connected between the driven sheave 34 and the sheave assembly 23 with such belts being received within grooves 35 and 27 respectively. THe drive 10 also has means in the form of an assembly 37 for adjustably positioning the alternator 11 with respect to the fixed position of the idler sheave assembly 23 and the assembly 37 will be described in detail subsequently.

The drive 10 comprises a driver sheave 40 which is fixed to the terminal outer end surface 41 of the axle 15 by a plurality of screws 42 which extend through openings 43 in the driver sheave 40 and are received within threaded openings in the axle 15, see FIGS. 3 and 4. The driver sheave 40 has a plurality of two grooves 45 therein which correspond in configuration to the grooves 26 provided in the sheave 24 of the sheave assembly 23 and second belt means in the form of a plurality of two standard V-belts 46 are provided and operatively connected between the driver sheave 40 and the sheave assembly 23 by being received within the grooves 45 and 26 of the sheaves 40 and 24 respectively.

The drive 10 has means or a device for yieldingly urging the elongated support 16 about its hinged end 17 and in this example, such means comprises mechanical compression spring means which is designated generally by the reference numeral 50, see FIG. 1. The spring means 50 comprises a bracket 51 fixed to frame structure 12 and the bracket 51 has a horizontal portion 52 provided with an opening 53 extending therethrough. A cooperating opening 54 is provided through end 18 of the elongated support 16 and the opening 54 is arranged in aligned relation substantially vertically above the opening 53.

The device 50 includes an elongated rod 55 which has threaded opposite ends 56 which extend through openings 53 and 54 and with the rod thus positioned each end 56 receives a washer 57 therearound and an associated threaded nut 60 outwardly thereof. A coiled mechanical compression spring 61 is provided and spring 61 is loosely mounted on rod 55 between the bottom surface 62 of the elongated support 16 and the top surface of the horizontal portion 52 of bracket 51. The spring 61 urges outwardly thereby pivoting the entire support 16 about its hinged or pivoted end 17 and because the sheave assembly 23 is fixed to end portion 18 of support 16, the compression spring 61 places a substantially constant yielding tension on the V-belts 46 assuring controlled pressure contact by these belts within the grooves of their associated sheaves. This operating arrangement assures that the sheave assembly 23 is always positively driven in a controlled manner and inasmuch as the sheave assembly 23 is operatively connected to the driven sheave 34 by V-belts 36, the spring means 50 assures that the alternator 11 is driven in an optimum manner by the driver sheave 40 under substantially all operating conditions.

The previously mentioned aligned openings 53 and 54 are sufficiently large to allow unobstructed movement of the swinging end 18 of support 16 under the action of the compression spring 61. Further, the amount of tension imposed by the compression spring 61 on the belts 46 is determined primarily by the construction and design of such spring.

The elongated support 16 has a pair of spaced parallel lugs 63 welded to its end 17 and the lugs 63 have aligned openings 64 extending therethrough. The previously mentioned bracket assembly 21 is also comprised of a pair of upstanding lugs 65 fixed to a plate 66 which is in turn attached to the floor 22. The lugs 65 have aligned openings 67 extending therethrough and the support 16 is positioned so that the openings 64 in lugs 63 are arranged in aligned relation with the openings 67 in the lugs 65 and a pivot or hinge pin 68 is inserted through the openings 64 and 67 and is suitably held by cotter pins or the like against axial movement whereby the end 17 of support 16 is hingedly or pivotally mounted on the floor 22 of the vehicle V.

As previously explained, the drive 10 has an assembly 37 for adjustably positioning the alternator on the elongated support 16 and relative to the fixed position of the rotatable sheave assembly 23. The assembly 37 comprises a carrier which is designated generally by the reference numeral 70, see FIGS. 1, 2, and 5. The carrier 70 comprises a bottom plate 71 having two pairs of upstanding brackets 72 fixed thereto and suitable fasteners in the form of fastening pins 73 are provided for fastening the alternator in position on the brackets 72. Each fastening pin 73 extends through openings in an associated pair of brackets 72 and through an associated openings in a flange portion 74 extending from housing 33 of the alternator 11 and the pins 73 are suitably held against axial movement by suitably retaining devices such as cotter pins or spring clips.

The plate 71 has a plurality of elongated openings 76 extending therethrough and each opening 76 is aligned with an associated circular opening 77 in the support 16. Each set of openings 76 and 77 has a threaded bolt 80 extending therethrough and each bolt has a cooperating nut. To move the carrier 70 and hence plate 71 along the support 16, the nuts are loosened and the carrier and alternator 11 with the belts 36 in position are moved either toward or away from the idler sheave assembly 23 along support 16 to provide the desired tension in the V-belts 36 whereupon the nuts 81 may be tightened to attach plate 71 and hence the carrier 70 at the desired position.

The drive 10 comprises a device 82 for precisely adjusting the position of the carrier 70 along the support 16. The device 82 comprises a flange 83 welded to the support 16 and the flange has a threaded opening 84 which receives a threaded bolt 85 therethrough and is provided with locknut 86. The carrier 70 may be precisely adjusted by loosening the locknut 86 and nuts 81 and then threading the bolt 85 either clockwise or counterclockwise to provide the desired tension in the belt 36. In particular, once the carrier 70 has been moved so that the desired tension has been provided in the belt 36, the nuts 81 are tightened thereby fixing the carrier in position and the locknut 86 is tightened against flange 83.

It will be noted that the end of the bolt 85 engages a bearing member 87 which is suitably fixed to a pair of brackets 72. The flange 83 and bolt 85 is arranged so that it engages the center of the bearing member 87 to assure adjusting movement of the carrier 70 along support 16 in a non-skewing manner.

Reference is now made to FIG. 4 for a more detailed description of the driver sheave 40. The sheave 40 is of simple and economical construction and may serve as an end cap for bearing means on the axle 15. The sheave 40 has a main portion 88 provided with a disc-like central web 89 which has the previously mentioned openings 43 extending therethrough. The sheave 40 also has an offset portion 90 which roughly extends both circumferentially and axially outwardly of portion 89 with the sheave installed on the end of its associated axle 15. The offset portion 90 has the grooves 45 provided therein and sheave 40 with its portions 89 and 90 are defined as a unitary structure from a single piece of material.

Thus, it is seen that the drive 10 allows precise tensioning of the V-belts 36 which are operatively connected between the sheave assembly 23 and the driven sheave 34 through the use of the adjustably positioned carrier 70. In addition, through the use of the spring means 50, yieldingly controlled tension is provided on the V-belts 46 whereby the alternator 11 is driven in an optimum manner under all operating conditions.

Reference is now made to FIG. 6 of the drawings which illustrates an assembly for adjustably positioning the alternator on the elongated support 16 and toward and away from the sheave assembly 23. The positioning assembly illustrated in FIG. 6 may be used interchangeably to position assembly 37 and will be designated generally by the reference numeral 37A. Instead of using a carrier the positioning assembly 37A has a pair of brackets 93 fixed directly against the elongated support 16 and the brackets 93 have openings 94 extending therethrough which are adapted to receive a pivot pin 95. The pin 95 extends through the openings 94 and through a cooperating opening in the flange 74 extending from housing 33 of alternator 11 to thereby pivotally fasten one end portion of the alternator to the brackets 93.

The opposite end portion of the alternator 11 has another flange 74 extending from its housing 33 and the flange 74 has an opening 100 extending therethrough. An adjustable arm 101 is provided and has an opening 102 at one end portion thereof and the opening 102 is adapted to be aligned with the opening 100 in the flange 74. Another pivot pin 103 extends through openings 100 and 102 and is suitably confined against axial movement once it is installed in position.

The arm 101 has an elongated slot 104 in its opposite end portion and the assembly 37A also has a bracket 105 which is fixed to the elongated support 16 and has a threaded screw 106 adjustably threaded within an associated threaded opening provided therein. The threaded screw 106 is extended through the elongated slot 104 to fix the arm 101 so that the effective length, indicated at 107, thereof may be precisely controlled. To move the alternator toward and away from the sheave assembly 23, the screw 106 is loosened allowing the effective length 107 to be adjusted and once the alternator 11 has been positioned in the desired manner and the desired tension has been placed on the belts 36, the screw 106 is again tightened to provide the controlled tension in the V-belts 36 in a similar manner as the tensioning provided by the carrier 70.

The spring means 50 illustrated in FIG. 1 comprises a compression spring 61; however, it will be appreciated that any suitable spring means may be used, whether a mechanical spring, pneumatic spring, or the like, and another exemplary embodiment of spring means which may be employed is illustrated in FIG. 7 and designated generally by the reference numeral 50A. The spring means 50A may be used interchangeably with the spring means 50 and the spring means 50A comprises a vertical support 110 having its lower end welded to the frame 12 and having a horizontal arm 111 provided at its upper end with downwardly extending supporting lugs 112. A pin 113 is attached to the lugs 112 and the pin 113 supports an end 114 of a tension spring assembly 115.

The tension spring assembly 115 has a threaded rod portion 116 extending from its opposite end and the threaded rod portion 116 is attached to a bracket 117 fixed to the structure 12. The bracket 117 has a horizontal arm 120 and the arm 120 has an opening 122 extending therethrough which is adapted to receive threaded end portion 116 and threaded nut 123 is then threaded in position so that its inside surface engages the bottom surface of arm 120 to provide the desired tension on the spring assembly 115. The end 114 is supported by the pin 113 so that it is freely pivotable and allows unobstructed pivoting movement of the elongated support 16 whereby the tension spring assembly 115 provides the desired tension on the V-belts 46 in a similar manner as the compression spring of spring assembly 50.

In this example of the invention, two V-belts are shown associated with the sheaves 40 and 34; however, a single belt, or more than two belts may be used in association with these sheaves. In addition, it will be appreciated that belts other than V-belts may be used in accordance with the teachings of this invention. However, regardless of the belts employed and of the manner of applying tension on the belts 36 or 46, this invention provides a drive in which all the operating components thereof are easily accessible. In addition, the manner in which the various components cooperate enable the belts to be used with optimum efficiency to assure long operating life and minimum maintenance.

While present exemplary embodiments of this invention and methods of practicing the same, have been illustrated and described, it will be recognized that this invention may be otherwise variously embodied and practiced within the scope of the following claims.

What is claimed is:

1. A belt drive apparatus for a vehicle mounted alternator comprising, an elongated support having opposed end with one of said ends being hingedly mounted on said vehicle, an alternator mounted on said support adjacent said one end and having a driven sheave fixed to its rotor, an idler sheave assembly rotatably supported on said support adjacent the other of said ends, first belt means operatively connected between said driven sheave and said sheave assembly, a driver sheave carried by said vehicle and driven by a rotatable shaft of said vehicle, said belt means operatively connected between said driver sheave and said sheave and said sheave assembly, and means yieldingly urging said support about its hingedly mounted end thereby moving said sheave assembly away from said driver sheave and placing a constant yielding tension on said second belt means assuring said sheave assembly and hence said alternator is driven in an optimum manner.

2. A drive apparatus as set forth in claim 1 to which said sheave assembly is rotatably mounted at a fixed position on said support and further comprising means for adjustably positioning said alternator on said support toward and away from said fixed position to provide a controlled tension in said first belt means.

3. A drive apparatus as set forth in claim 2 in which said means for adjustably positioning said alternator on said support comprises a carrier slidably supported on said support and further comprising a device for precisely adjusting the position of said carrier and means fastening said carrier at its adjusted position on said support.

4. A drive apparatus as set forth in claim 1 in which said driver sheave is detachably fixed to the outer end of said rotatable shaft and said rotatable shaft is in the form of an axle for said vehicle.

5. A drive apparatus as set forth in claim 4 in which said driver sheave has a plurality of grooves therein each adapted to receive an associated belt and said second belt means comprises a plurality of belts each received within an associated groove of said driver sheave.

6. A drive apparatus as set forth in claim 1 in which said means yieldingly urging said support comprises compression spring means acting between said vehicle and said other end of said support.

7. A drive apparatus as set forth in claim 1 in which said means yieldingly urging comprises tension spring means acting between said vehicle and said other end of said support.

8. A drive apparatus as set forth in claim 1 in which said sheave assembly is in the form of a step sheave assembly which for a given speed of said driver sheave provides a different speed for said driven sheave.

9. A drive apparatus as set forth in claim 1 in which said first and second belt means each comprises a plurality of belts.

10. A drive apparatus as set forth in claim 1 in which said first and second belt means comprise V-belts each having a substantially trapezoidal cross-sectional configuration.

11. A drive apparatus as set forth in claim 2 in which said means for adjustably positioning said alternator comprises means pivotally attaching one portion of said alternator on said support and an arm of adjustable length having one end portion pivotally mounted on said alternator at a location opposite said one portion and having its opposite end attached to said support to thereby move said alternator and driven sheave toward and away from said sheave assembly to provide said controlled tension.

12. A drive apparatus as set forth in claim 11 in which said arm has an elongated slot therein and further comprising a bracket fixed to said support adjacent its hinged end and a fastener extending through said slot and being fastened to said bracket, said alternator being pivoted about its pivotally mounted portion so that said fastener is arranged at different positions along said elongated slot to thereby control the effective length of said arm and said controlled tension upon fastening said fastener in position against said arm.

13. A belt drive apparatus for an alternator mounted on a railway vehicle, said apparatus comprising, an elongated support having opposed ends with one of said ends being hingedly mounted on said vehicle, an alternator mounted on said support adjacent said one end and having a driven sheave detachably fixed to its rotor, an idler sheave assembly rotatably supported on said support adjacent the other of said ends, first belt means operatively connected between said driven sheave and said sheave assembly, a driver sheave carried by said vehicle and driven by an axle of said vehicle, second belt means operatively connected between said driver sheave and said sheave assembly, and means yieldingly urging said support about its hingedly mounted end thereby moving said sheave assembly away from said driver sheave and placing a constant yielding tension on said second belt means assuring said sheave assembly and hence said alternator is driven in an optimum manner.

14. A drive apparatus as set forth in claim 13 in which said sheave assembly is rotatably mounted at a fixed position on said support and further comprising means for adjustably positioning said alternator on said support toward and away from said fixed position to provide a controlled tension on said first belt means.

15. A drive apparatus as set forth in claim 14 in which said driver sheave is detachably fixed to the outer end of said axle.

16. A drive apparatus as set forth in claim 15 in which said driver sheave has an inner portion provided with openings therein adapted to receive fasteners for fastening said driver sheave to said outer end of said axle, said driver sheave having an outwardly offset portion provided with a plurality of grooves therein each adapted to receive an associated belt, said inner portion and offset portion being made as a single unit, and said second belt means comprises a plurality of belts each received within an associated groove of said driver sheave.

17. A drive apparatus as set forth in claim 16 in which said means yieldingly urging said support comprises compression spring means acting between said vehicle and said other end of said support.

18. A drive apparatus as set forth in claim 16 in which said means yieldingly urging said support comprises tension spring means acting between said vehicle and said other end of said support.

19. An apparatus as set forth in claim 16 in which said means for adjustably positioning said alternator on said support comprises a carrier slidably supported on said support and means for attaching the carrier at its adjusted position.

20. A drive apparatus as set forth in claim 16 in which said means for adjustably positioning said alternator comprises means pivotally attaching one portion of said alternator on said support and an arm of adjustable length having one end portion pivotally mounted on said alternator at a location opposite said one portion and having its opposite end attached to said support to thereby move said alternator and driven sheave toward and away from said sheave assembly to provide said controlled tension.

* * * * *

PO-1050
(5/69)

UNITED STATES PATENT OFFICE
CERTIFICATE OF CORRECTION

Patent No. 3,702,570            Dated November 14, 1972

Inventor(s)  Tieme C. Stikkers

It is certified that error appears in the above-identified patent and that said Letters Patent are hereby corrected as shown below:

Column 6, lines 46 and 47, rewrite as follows:

--- said vehicle, second belt means operatively connected between said driver sheave and said ---

Signed and sealed this 13th day of November 1973.

(SEAL)
Attest:

EDWARD M. FLETCHER, JR.                RENE D. TEGTMEYER
Attesting Officer                      Acting Commissioner of Patents